United States Patent [19]

Albrecht et al.

[11] Patent Number: 4,674,316
[45] Date of Patent: Jun. 23, 1987

[54] CALIBRATION SYSTEM FOR MECHANICAL GAS VOLUME CORRECTOR

[75] Inventors: Charles W. Albrecht, Warminster, Pa.; Malcolm W. Cornforth, Edgewater Park, N.J.

[73] Assignee: The Singer Company, Stamford, Conn.

[21] Appl. No.: 854,263

[22] Filed: Apr. 21, 1986

[51] Int. Cl.[4] ........................ G01F 25/00; G01F 3/22; G01F 15/04
[52] U.S. Cl. .......................................... 73/3; 73/233; 73/281; 73/861.01
[58] Field of Search ................. 73/3, 233, 281, 861.01

[56] References Cited

U.S. PATENT DOCUMENTS

| | | | |
|---|---|---|---|
| 1,893,200 | 1/1933 | Dolbey et al. | 73/3 X |
| 3,083,570 | 4/1963 | Trumon | 73/3 X |
| 3,187,551 | 6/1965 | Hill | 73/3 |
| 3,439,538 | 4/1969 | Forrell | 73/3 X |
| 3,517,308 | 6/1970 | Mirdadian | 73/3 X |
| 3,631,709 | 1/1972 | Smith et al. | 73/3 |
| 3,710,624 | 1/1973 | Kuglos | 73/233 |
| 4,463,613 | 8/1984 | Schmittner et al. | 73/3 X |
| 4,498,346 | 2/1985 | Schneider, Jr. | 73/233 X |
| 4,584,864 | 4/1986 | Neeff | 73/3 |

Primary Examiner—Tom Noland
Attorney, Agent, or Firm—David L. Davis

[57] ABSTRACT

A calibration system for a mechanical gas volume corrector which has a first shaft turned at a rate corresponding to the otherwise uncorrected volumetric flow rate through the meter, a second shaft, a variable ratio transmission coupled between the first and second shafts, and a mechanism for altering the ratio of the transmission in response to changes of a physical condition of the gas. The calibration system includes an arrangement for applying a representation of a reference state of the physical condition to the ratio altering mechanism, and indicator for indicating a fixed number of revolutions of one of the shafts, an arrangement for determining the number of revolutions of the other of the shafts corresponding to the fixed number of revolutions of the one shaft, and a calculator for determining and displaying the ratio of the other shaft revolution number to the fixed number. The calibration system also includes an adjustment mechanism for changing the zero setting and the span (or gain) of the ratio altering mechanism.

7 Claims, 6 Drawing Figures

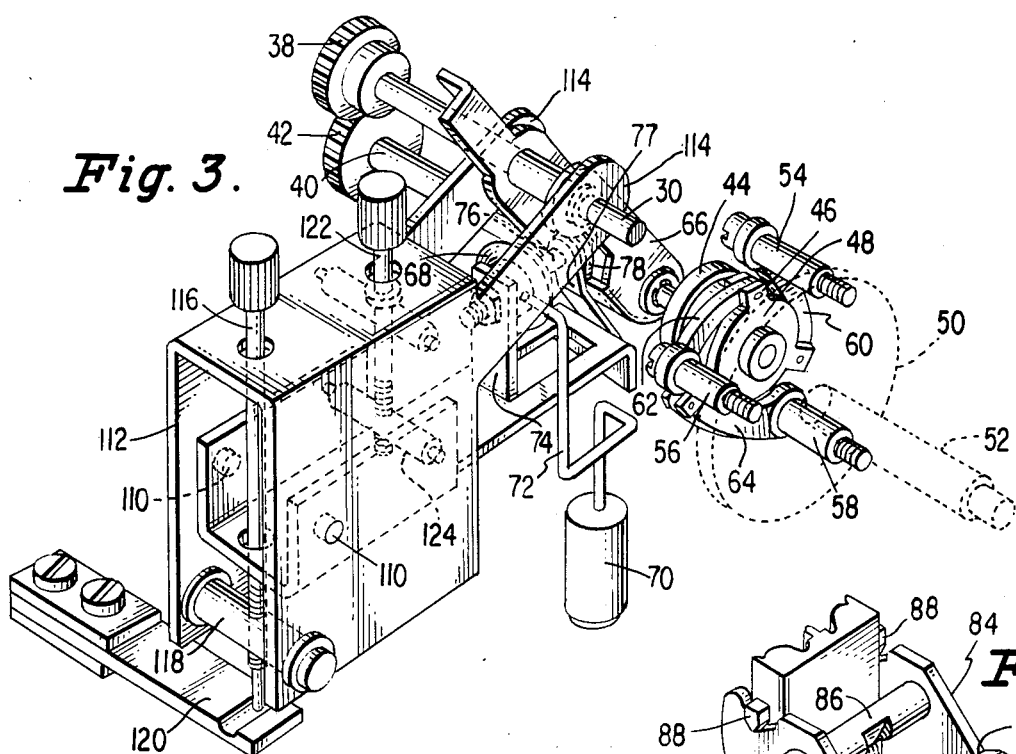
Fig. 3.
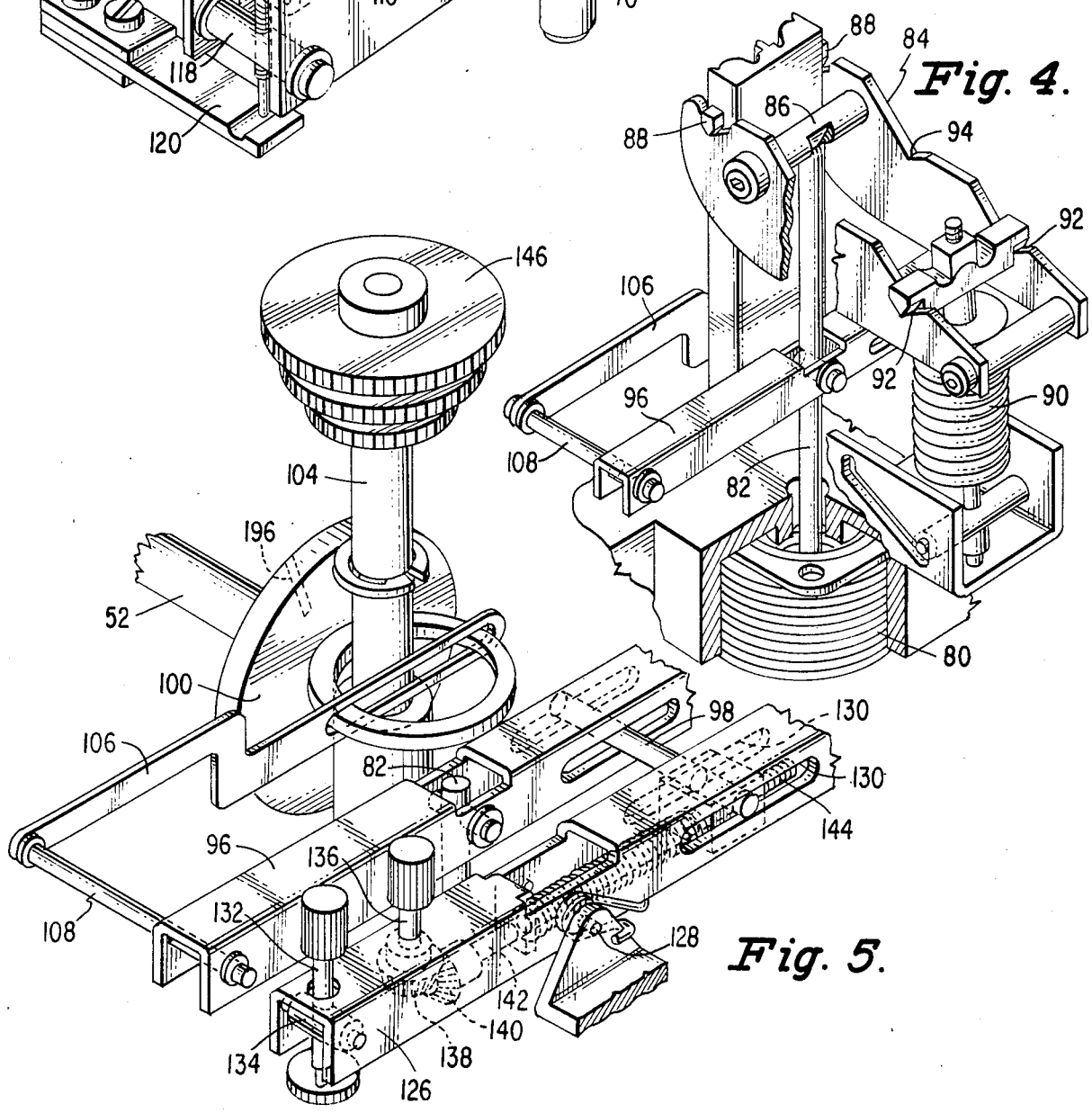
Fig. 4.
Fig. 5.

CALIBRATION SYSTEM FOR MECHANICAL GAS VOLUME CORRECTOR

BACKGROUND OF THE INVENTION

This invention relates to mechanical volume correctors for gas meters and, more particularly, to a calibration system for such a corrector.

It is conventional to provide a larger capacity gas meter with a correcting mechanism for continuously correcting volumetric flow measured by the meter to standard conditions of temperature and pressure. Considering the high cost of gas, it has become increasingly important that the correcting mechanism be properly calibrated. Unfortunately, with most mechanical correctors now available, service and calibration procedures are tedious and time consuming.

It is therefore an object of the present invention to provide a calibration system for a mechanical gas volume corrector which is simple to use and which minimizes the time required to calibrate the corrector.

SUMMARY OF THE INVENTION

The foregoing, and additional, objects are attained in accordance with the principles of this invention in combination with a gas meter volume corrector having a first shaft adapted to be turned at a rate corresponding to the otherwise uncorrected volumetric flow rate through the meter, a second shaft, a variable ratio transmission coupled between the first and second shafts, and means for altering the ratio of the transmission in response to changes of a physical condition of the gas, by providing an arrangement for determining the accuracy of the corrector comprising means for applying a representation of a reference state of the physical condition to the ratio altering means, means for indicating a fixed number of revolutions of one of the shafts, means for determining the number of revolutions of the other of the shafts corresponding to the fixed number of revolutions of the one shaft, and means for determining and displaying the ratio of the other shaft revolution number to the fixed number.

In accordance with an aspect of this invention, the physical condition is the temperature of the flowing gas and the one of the shafts is the second shaft.

In accordance with another aspect of this invention, the physical condition is the pressure of the flowing gas and the one of the shafts is the first shaft.

BRIEF DESCRIPTION OF THE DRAWINGS

The foregoing will be more readily apparent upon reading the following description in conjunction with the drawings in which like elements in different figures thereof have the same reference character applied thereto and wherein:

FIG. 3 is an enlarged perspective view showing the temperature correcting and calibrating mechanism of the system shown in FIG. 1;

FIG. 4 is an enlarged perspective view illustrating the pressure sensing mechanism of the system shown in FIG. 1;

FIG. 5 is an enlarged perspective view showing the pressure correcting and calibrating mechanism of the system shown in FIG. 1.

DETAILED DESCRIPTION

Figure 1:
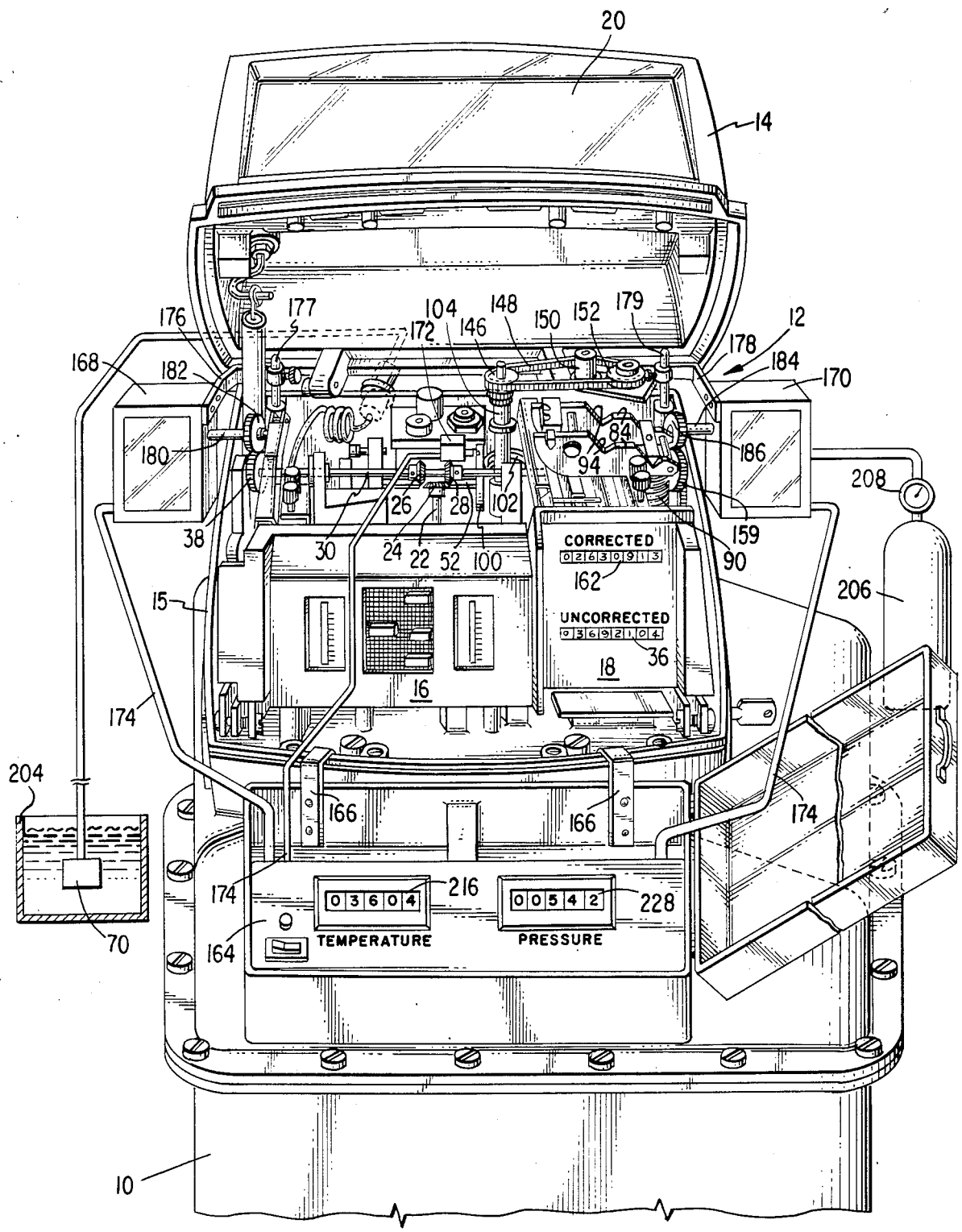
FIG. 1 is a front perspective view of a mechanical corrector for a gas meter and a calibration system therefor constructed in accordance with the principles of this invention.

Referring now to the drawings, FIG. 1 shows a gas meter 10 upon which is mounted a mechanical gas volume corrector, designated generally by the reference numeral 12. The corrector 12 is shown with its cover 14 raised but typically the cover 14 is in a lowered position on the body 15 so that only the chart recorder portion 16 and the register portion 18 are visible through the window 20. The corrector 12 includes an input shaft 22 which is coupled to the meter 10 in a conventional manner such that it is turned at a rate corresponding to the uncorrected volumetric flow rate of gas through the meter 10. As will be described in more detail hereinafter, the corrector 12 may include a temperature correction section and a pressure correction section, each of which includes a variable ratio transmission and means for altering the ratio of the transmission in response to temperature or pressure, respectively, changes in the gas enclosed in the meter.

The input shaft 22 is coupled to the correcting sections through the bevel gear 24 mounted on the input shaft 22 and either one or the other of the two bevel gears 26 and 28 mounted on the shaft 30. Only one of the bevel gears 26 and 28 is engaged with the bevel gear 24 so that the shaft 30 always rotates in the same direction, irrespective of the direction of rotation of the input shaft 22.

The shaft 30 is journaled for rotation in a conventional manner and at one end has mounted thereon a sprocket wheel 32 (FIG. 2) which carries thereon a chain 34 for driving the uncorrected volume index 36. The other end of the shaft 30 has mounted thereon a gear 38 which drives the temperature correcting mechanism shown in more detail in FIG. 3. The temperature correcting mechanism includes a variable ratio transmission varied by a temperature responsive element. The variable ratio transmission includes three one-way clutches and a follower disc, the principle of operation of same being fully described in U.S. Pat. No. 4,498,346, issued Feb. 12, 1985, to George W. Schneider, Jr., the contents of which are incorporated by reference herein. As shown in FIG. 3, the input from the meter 10 over the shaft 30 is coupled through the gear 38 to the shaft 40 via the gear 42. Rotation of the shaft 40 causes the three one-way clutches 44, 46 and 48 mounted thereon to be turned at a speed proportional to the output of the meter. A follower disc 50 mounted on the shaft 52 has drive pins 54, 56, and 58 extending therefrom and connected by links 60, 62 and 64, each to a respective one of the clutches 44, 46 and 48. There is an offset between the clutch shaft 40 and the follower disc shaft 52, which offset is made to vary inversely with temperature, as described in the above-referenced patent. The lower the temperature, the greater the offset and the greater the speed multiplication.

As the three clutches 44, 46 and 48 are driven in unison by the shaft 40, the clutch with its link connection closest to the center line of the follower disc 50 does the driving. At this point, the other two clutches are driven by the follower disc 50 and are free wheeling. During one complete revolution of the clutch shaft 40, each clutch becomes the driver for exactly 120° of rotation. The clutch shaft 40 is journaled for rotation in the clutch bracket 66, which in turn is mounted for pivoting motion about the shaft 30. The thermal system of the temperature correcting mechanism consists of an organic liquid filled diaphragm 68 and thermal bulb 70 connected by armored capillary tubing 72. The thermal bulb 70 is mounted in the flowing gas stream (meter or pipe). Expansion and contraction of the liquid in the bulb 70, the tubing 72, and the diaphragm 68 causes a direct linear displacement of the diaphragm 68, one end of which is mounted on the bracket 74. The other end of the diaphragm 68 is connected to a rod 76 which bears against the tab 78 of the clutch bracket 66 through a leaf spring 77 which acts to center the rod 76 to avoid hysteresis of the mechanism. The displacement of the diaphragm 68 in response to temperature changes controls the offset dimension of the clutch-follower disc assembly by rotating the clutch bracket 66 and the shaft 40 about its pivot point (i.e., the shaft 30). As the flowing gas temperature increases, the diaphragm 68 expands, thereby pushing the clutch bracket 66 so that the offset dimension decreases. The result is a decrease in speed of the follower disc shaft 52 relative to the clutch shaft 40.

As illustrated in FIG. 4, the pressure sensing mechanism includes a bellows 80 mounted to sense the pressure of the flowing gas. The bellows 80 has an output stem 82 which acts upwardly on the balance beam 84 by bearing against the cross rod 86 connected to the two arms of the balance beam 84. The balance beam 84 pivots about the pivot point 88 and is pulled downwardly by a range spring 90 which may be positioned at a high pressure setting or a low pressure setting by means of the notches 92 and 94, respectively. As increasing pressure of the gas causes the bellows 80 to compress, the bellows stem 82 acts upwardly on the balance beam 84, extending the range spring 90 until a balance of forces exists. To provide the input to the pressure correcting mechanism, FIG. 5 shows the stem 82 coupled to move the output arm 96 about its pivot pin 98 so that the motion of the output arm 96 is proportional to gas pressure. The pressure correcting mechanism is a ring and disc variable ratio transmission. The spring loaded disc 100 is mounted for rotation on the temperature correcting mechanism output shaft 52 and holds the ring 102 against the shaft 104 with constant pressure so that the speed of the shaft 104 relative to the speed of the shaft 52 is a function of the position of the ring 102 with respect to the disc 100. A yoke link 106 is connected to the output arm 96 by a rod 108 and guides the ring 102 along the disc 100. As the gas pressure increases, the yoke link 106 guides the ring 102 outward away from the center of the disc 100, resulting in an increase in the relative speed of the shaft 104. As pressure decreases, the yoke link 106 guides the ring 102 inward, toward the axis of rotation of the disc 100, decreasing the relative speed of the shaft 104.

Figure 2:
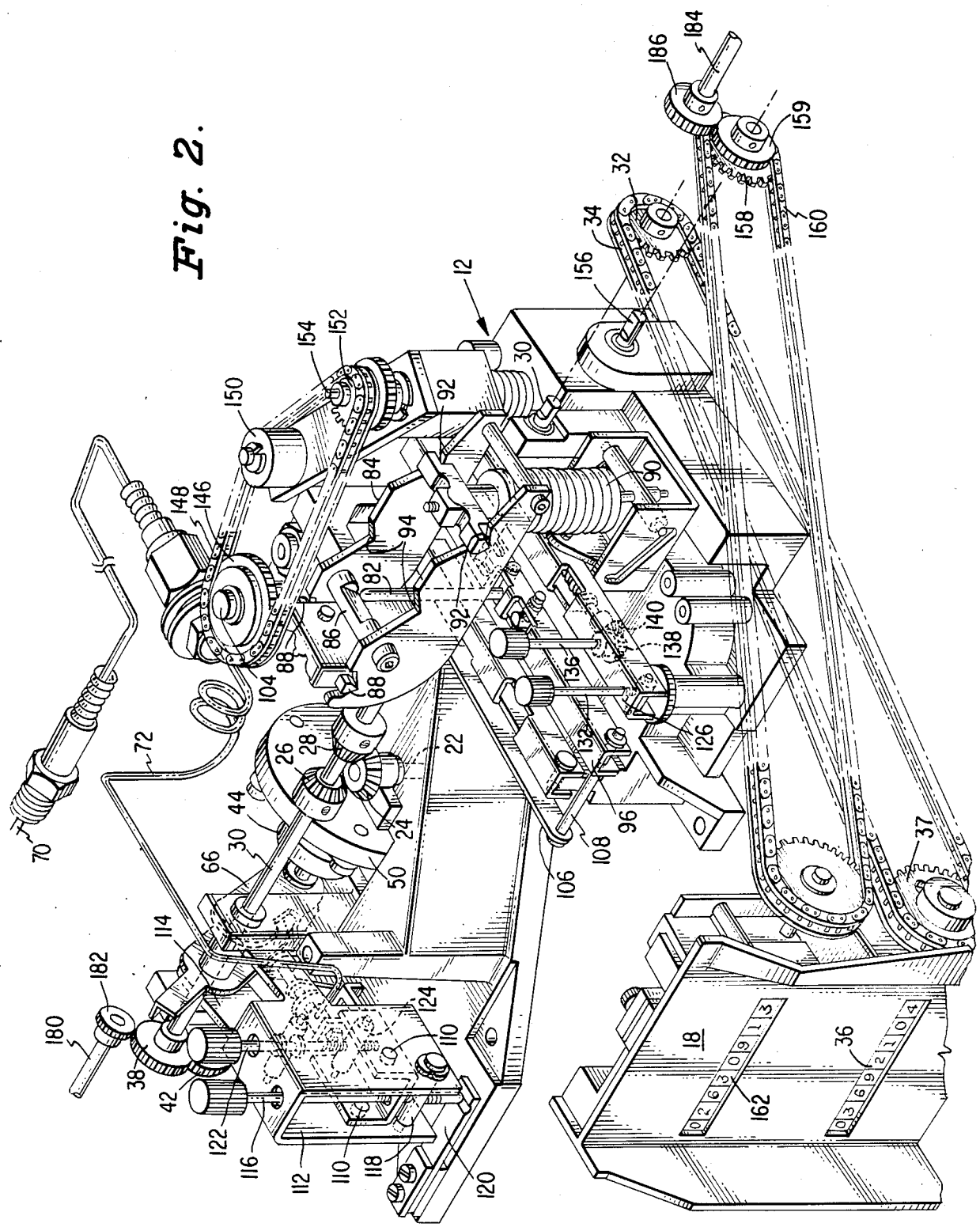
FIG. 2 is an enlarged side perspective view of the corrector system shown in FIG. 1.

Referring now to FIG. 2, a sprocket wheel 146 is mounted on the end of the shaft 104 and carries thereon a chain 148 which passes over the idler 150 to engage the sprocket wheel 152 mounted on the shaft 154. The shaft 154 in turn drives the shaft 156 through a coupling mechanism (not shown), the shaft 156 having the sprocket wheel 158 mounted thereon. The sprocket wheel 158 carries the chain 160 which drives the corrected volume index 162.

In order to adjust, or calibrate, the temperature and pressure correcting mechanisms, means are provided for adjusting the zero point and the span (gain) of the correction curves. In the case of the temperature correcting mechanism, FIG. 3 shows the bracket 74 which holds the diaphragm 68 is mounted for pivoting motion about the pivot pin 110 with respect to the frame 112 which in turn is pivotally mounted about the shaft 30 by means of the extensions 114. The threaded calibration shaft 116 which extends through a threaded cross hole in the rod 118 pivots the frame 112 about the shaft 30 to change the zero point of the temperature correcting curve. The end of the shaft 116 bears against the bi-metal 120 which compensates for changes in the case temperature. The threaded calibration shaft 122 engages the rod 124 to pivot the bracket 74 with respect to the frame 112 about the pivot points 110 to change the span (or "gain") of the temperature correcting curve.

Referring now to FIG. 5, to adjust the pressure correcting mechanism, there is provided an arrangement whereby the pivot pin 98 of the output arm 96 may be moved. Toward this end, there is provided an adjustment arm 126 pivoted about the pin 128 with respect to the corrector body 15 and having slots 130 for allowing lateral motion of the pivot pin 98. A bevel gear 138 mounted on the end of the calibration shaft 136 engages the bevel gear 140 mounted on the adjustment shaft 142. The adjustement shaft 142 is threaded at its end 144 and passes through a threaded cross hole in the pivot pin 98 so that turning of the calibration shaft 136 causes the pivot pin 98 to move laterally within the slots 130. The threaded calibration shaft 132 cooperates with the cross rod 134 mounted on the adjustment arm 126 to pivot the adjustment arm 126 about its pivot pin 128 so as to change the zero setting of the pressure correcting curve. The calibration shaft 136 is used to adjust the span (or "gain") of the pressure correcting curve.

Figure 6:
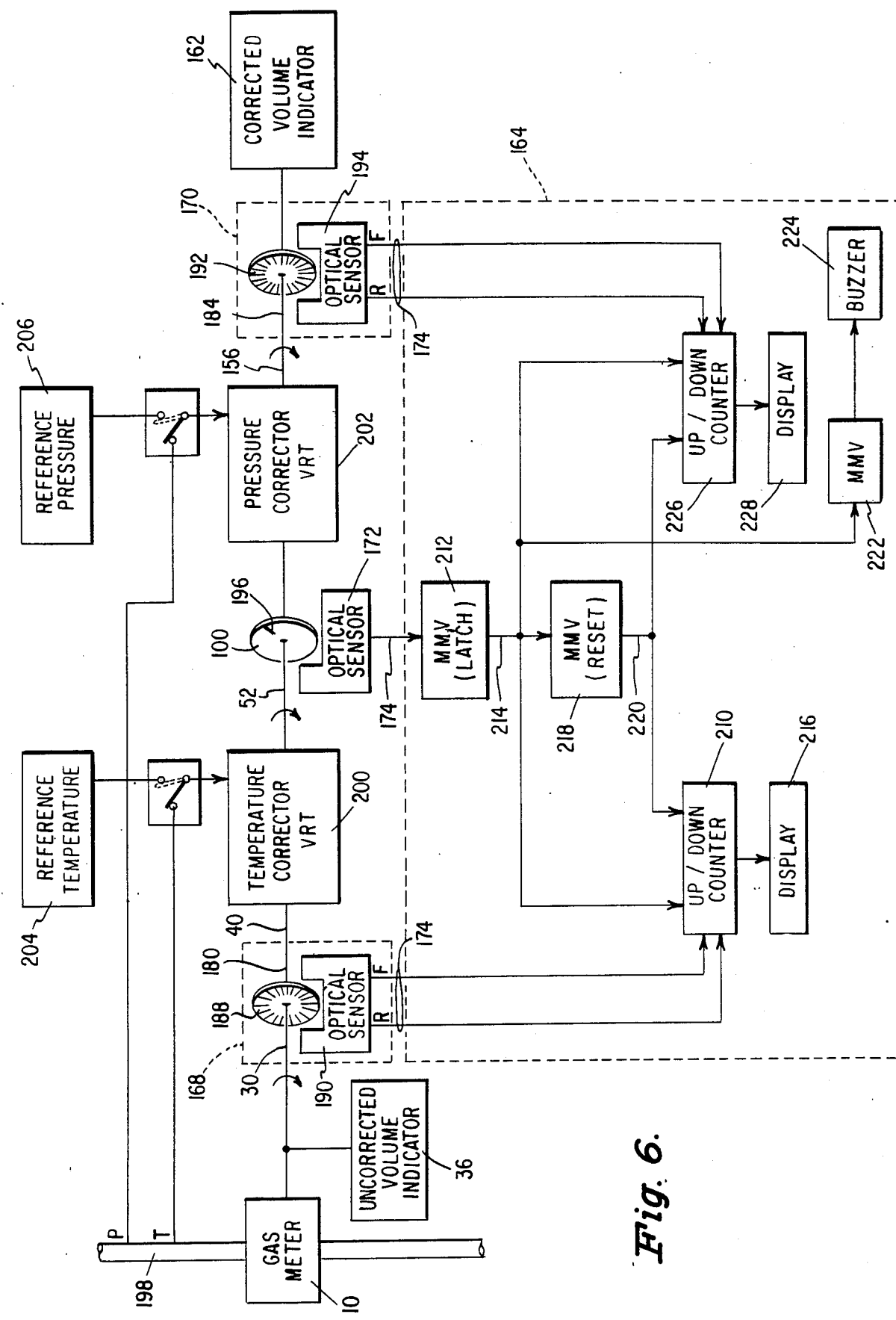
FIG. 6 is a combined block schematic diagram of the mechanical and electrical systems according to this invention.

To properly calibrate the temperature and pressure correcting mechanisms, it is necessary that the responses of these mechanisms to variations in temperature and pressure be known and compared with the desired responses. Accordingly, there is provided such response measuring apparatus as is shown in FIGS. 1 and 6. When it is desired to calibrate the corrector 12, the cover 14 is opened and the portable console 164 is put in place, illustratively by means of the hangers 166. The console 164 may be part of a suitcase (not shown) which includes fitted compartments for the peripheral equipment. This peripheral equipment includes a first optical encoder 168 and a second optical encoder 170 in addition to an optical detector 172. The encoders 168 and 170 and the detector 172 are connected to the console 164 by wires 174.

The optical encoder 168 is mounted on the body 15 by a hanger 176 on a hanger shaft 177 and the optical encoder 170 is mounted on the body 15 by a hanger 178 on a hanger shaft 179. The optical encoder 168 includes a shaft 180 extending outwardly therefrom, at the distal end of which is a gear 182 which engages the gear 38 on the shaft 30. Similarly, the shaft 184 extends outwardly from the optical encoder 170 and has a gear 186 mounted on its distal end for engagement with the gear 159 attached to the sprocket wheel 158. Referring now to the schematic FIG. 6, within the optical encoder 168 is an apertured disc 188 mounted on the shaft 180 for rotation therewith. The disc 188 is straddled by an optical sensor unit 190 which provides output signals over its set of wires 174 as the apertures in the disc 188 pass the optical sensor unit 190. Preferably, the optical encoder 168 provides one thousand pulses per revolution of the shaft 180, and discriminates between the directions of rotation of the shaft 180 to put out forward and reverse pulses over the wires 174. Similarly, the optical encoder 170 includes an apertured disc 192 mounted on the shaft 184 and an optical sensor unit 194 straddling the disc 192. Thus, the optical encoder 168 provides a means for determining the revolutions of the uncorrected input shaft 30 and the optical encoder 170 provides a means for determining the revolutions of the fully corrected (temperature and pressure) output shaft 156. To determine the revolutions of the temperature corrected shaft 52, the optical detector 172 is mounted in close proximity to the disc 100 which is marked at 196 so that the optical sensor 172 can provide a pulse for each revolution of the temperature corrected shaft 52.

As is shown schematically in FIG. 6, during normal operation as gas flows through the pipeline 198 the meter 10 measures the volumetric flow rate and provides this as an input to the temperature corrector variable ratio transmission 200 via the shafts 30 and 40. Afternately, the input bevel gears 26 or 28 can be disengaged, and the input shaft 30 can be driven manually preferably by manually rotating the uncorrected sprocket 37 (see FIG. 2). This technique speeds up calibration by increasing shaft 30 rotation significantly over that from the meter. The temperature corrector variable ratio transmission 200 includes the one-way clutches 44, 46 and 48 and the follower disc 50 as well as the means for altering the ratio of the transmission, which includes the diaphragm 68 and the clutch bracket 66. Similarly, pressure correction is effected via the pressure corrector variable ratio transmission 202 which includes the disc 100 and the ring 102, as well as the means for altering the ratio of the transmission which includes the bellows 80, the output arm 96 and the yoke link 106.

When it is desired to calibrate the correcting system, the console 164 and encoders 168 and 170 are put in place on hangers 176 and 178 after placing hanger shafts 177 and 179, respectively. It is then necessary to supply reference temperatures and/or pressures. To calibrate the temperature correcting mechanism, two reference temperatures are required. Similarly, two references pressures are required to calibrate the pressure correcting mechanism. As shown in FIG. 1, the reference temperatures may be obtained by immersing the thermal bulb 70 in a water bath 204 of known temperatures. The reference pressures may be obtained by connecting a pressurized tank 206 having a regulator 208 to an appropriate port communicating with the bellows 80. An alternate device for providing a reference pressure, having a much higher accuracy than the illustrative tank and regulator, is by means of a dead weight tester. A dead weight tester applies a highly calibrated weight to a piston in a cylinder to provide the reference pressure.

Referring now to FIG. 6, with the reference temperature 204 being applied to the temperature corrector variable ratio transmission 200, the optical sensor 190 provides pulses to the up/down counter 210. To account for a jittery drive, the forward direction pulses add to the count in the counter 210 and the reverse direction pulses substract from the count in the counter 210, so that there is no error. When the mark 196 on the disc 100 is sensed by the optical sensor 172, a pulse is provided to trigger the monostable multivibrator 212 which provides a pulse over the lead 214. The leading edge of the pulse on the lead 214 causes the count of the counter 210 to be latched into the display 216. The trailing edge of the pulse on the lead 214 triggers the monostable multivibrator 218 which provides a pulse on the lead 220 which zeros the counter 210, with the display 216 remaining latched. The leading edge of the pulse on the lead 214 also triggers the monostable multivibrator 222 which causes the buzzer 224 to be activated each time the disc 100 makes one revolution and the display 216 is updated. The display 216 displays the ratio of the uncorrected measured flow rate to the temperature corrected flow rate. Since the temperature at which this correction has been made is known, the desired correction factor is compared with that which is displayed. If this is done at two different reference temperatures, then the temperature correcting mechanism can be properly calibrated.

Similarly, the reference pressure 206 may be applied to the pressure corrector variable ratio transmission 202 and the pulses from the optical sensor 194 are applied to the up/down counter 226. The contents of the counter 226 are latched into the display 228 each time the disc 100 makes one revolution. Accordingly, the display 228 displays the ratio of the pressure corrected flow rate to the flow rate uncorrected for pressure. As with the temperature correcting mechanism, the desired correction factors for known pressures are known and with two different reference pressure readings, the pressure correcting mechanism can be properly calibrated.

The above-described system is portable, battery operated, and easy to utilize. Furthermore, it is readily adaptable to automatic control for factory calibration of the corrector.

Accordingly, there has been disclosed an improved calibration system for a mechanical gas volume corrector. It is understood that the above-described embodiment is merely illustrative of the application of the principles of this invention. Numerous other embodiments may be devised by those skilled in the art without departing from the spirit and scope of this invention, as defined by the appended claims.

We claim:

1. In combination with a gas meter temperature corrector having an input shaft adapted to be turned at a rate corresponding to the volumetric flow rate through the meter as uncorrected for temperature, an output shaft, a variable ratio transmission coupled between the input and output shafts, and means for altering the ratio of the transmission in response to temperature changes in the gas, an arrangement for determining the accuracy of the corrector comprising:
   means for applying a representation of a reference temperature to said ratio altering means;
   means for indicating a fixed number of revolutions of said output shaft;
   means for determining the number of revolutions of said input shaft corresponding to said fixed number of revolutions of said output shaft; and
   means for determining and displaying the ratio of said input shaft revolution number to said fixed number.

2. In combination with a gas meter pressure corrector having an input shaft adapted to be turned at a rate corresponding to the volumetric flow rate through the meter as uncorrected for pressure, an output shaft, a variable ratio transmission coupled between the input and output shafts, and means for altering the ratio of the transmission in response to pressure changes in the gas, an arrangement for determining the accuracy of the corrector comprising:

means for applying a representation of a reference pressure to said ratio altering means;

means for indicating a fixed number of revolutions of said input shaft;

means for determining the number of revolutions of said output shaft corresponding to said fixed number of revolutions of said input shaft; and means for determining and displaying the ratio of said output shaft revolution number to said fixed number.

3. In combination with a gas meter volume corrector having a first shaft adapted to be turned at a rate corresponding to the otherwise uncorrected volumetric flow rate through the meter, a second shaft, a variable ratio transmission coupled between the first and second shafts, and means for altering the ratio of the transmission in response to changes of a physical condition of the gas, an arrangement for determining the accuracy of the corrector, comprising:

means for applying a representation of a reference state of said physical condition to said ratio altering means;

means for indicating a fixed number of revolutions of one of said shafts;

means for determining the number of revolutions of the other of said shafts corresponding to said fixed number of revolutions of said one shaft; and means for determining and displaying the ratio of said other shaft revolution number to said fixed number.

4. The arrangement according to claim 3 wherein said physical condition is the temperature of the flowing gas and said one of said shafts is said second shaft.

5. The arrangement according to claim 3 wherein said physical condition is the pressure of the flowing gas and said one of said shafts is said first shaft.

6. The arrangement according to claim 3, wherein the corrector further includes a third shaft, a second variable ratio transmission coupled between the second and third shafts, means for altering the ratio of the second transmission in response to changes of a second physical condition of the gas, and said one of said shafts is said second shaft, the arrangement further comprising:

means for applying a representation of a reference state of said second physical condition to said second ratio altering means;

means for determining the number of revolutions of said third shaft corresponding to said fixed number of revolutions of said second shaft; and means for determining and displaying the ratio of said third shaft revolution number to said fixed number.

7. The arrangement according to claim 6 wherein the first physical condition is the temperature of the flowing gas and the second physical condition is the pressure of the flowing gas.

* * * * *